J. L. COOK.
STEERING SYSTEM LOCK.
APPLICATION FILED DEC. 2, 1920.
1,419,024.
Patented June 6, 1922.
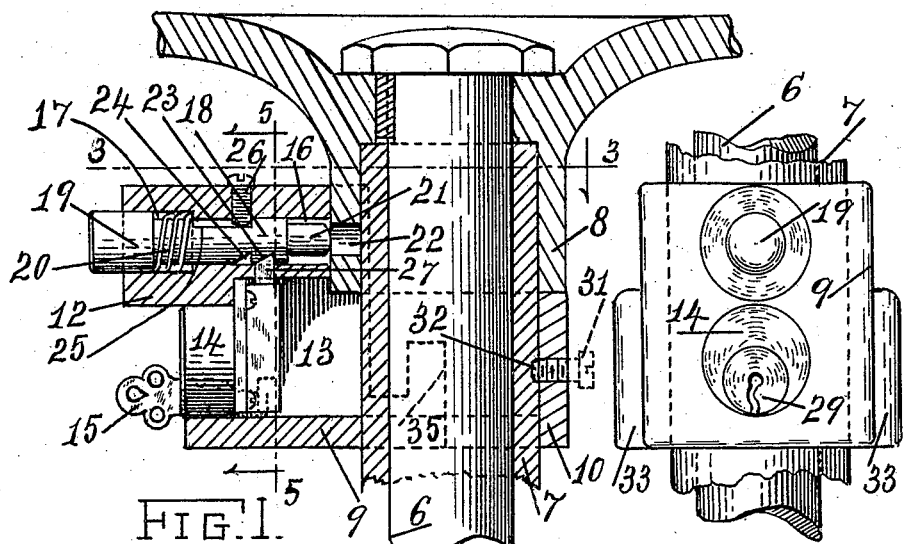
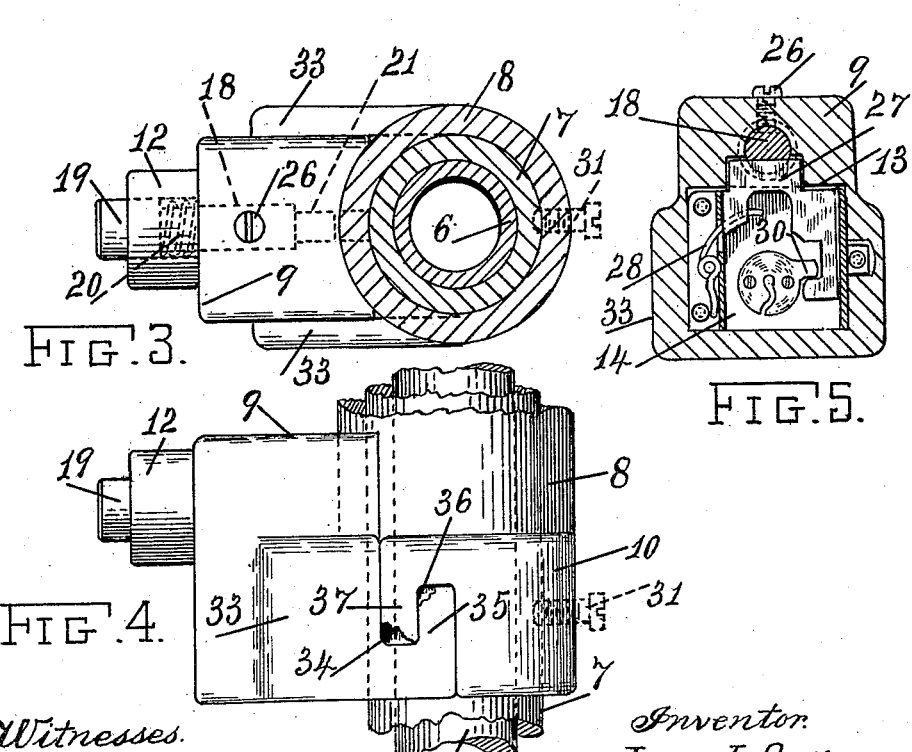
Witnesses.
A. D. Du Bois.
O. D. Du Bois.
Inventor.
James L. Cook.
by Atty N. Du Bois.

UNITED STATES PATENT OFFICE.

JAMES L. COOK, OF SPRINGFIELD, ILLINOIS.

STEERING-SYSTEM LOCK.

1,419,024.    Specification of Letters Patent.    Patented June 6, 1922.

Application filed December 2, 1920. Serial No. 427,802.

*To all whom it may concern:*

Be it known that I, JAMES L. COOK, a citizen of the United States, residing at Springfield, in the county of Sangamon and State of Illinois, have invented a new and useful Steering-System Lock, of which the following is a specification.

The invention relates to steering-system locks for automobiles, or the like, adapted to lock the steering system and thereby prevent theft or unauthorized use of the vehicle.

I have shown and will describe means primarily designed for locking the steering system of automobiles, or the like; but it is obvious that the housing and locking devices herein set forth may,—without material modification, and without departure from my invention, be used to lock together two parts of other dirigible vehicles, one of said parts being normally rotative relatively to the other.

A preferred embodiment of the invention is illustrated in the annexed drawing, to which reference is hereby made, and will now be fully described and finally recited in the claims.

Figure 1 is a longitudinal axial section through a steering-system lock embodying my invention, in place on the stationary steering column of an automobile, Fig. 2 is a front elevation of the same mechanism; Fig. 3 is a horizontal transverse section through the hub of the steering wheel, the steering column, and the steering shaft, looking downward, and shows a top plan of the housing; Fig. 4 is a side elevation of the locking mechanism and Fig. 5 is a vertical section taken on the line 5 5 of Fig. 1.

The same reference numerals designate the same parts in all the views.

The purposes of the invention are: to provide a housing of improved construction, comprising interlocking members and means for securing the housing on the steering column and adapted to be easily and quickly attached to and safely secured on vehicles already in use, without the necessity for removing the steering wheel; to provide a locking bolt adapted to be pushed inward by hand to lock the mechanism; to provide a key-operated latch adapted to engage the locking bolt to prevent retraction of the bolt, except when a special key is used; and to provide other improved details of construction.

The housing and the exposed parts of the locking devices may preferably be made of steel and attractively finished in harmony with the finish of the vehicle on which they are used.

The rotative steering shaft 6 and the stationary steering column 7 are of usual construction. The hub of the steering wheel 8 is keyed on the shaft 6 so that rotation of the wheel will cause rotation of the shaft.

The housing is a two part structure comprising a first or main section 9 and a second or complemental section 10.

The section 9 has an extension 12, a bore 16 and a counterbore 17 to accommodate the locking bolt 18; a chamber 13 to accommodate a pin lock 14; and two integral side members 33, each side member having a notch 34 extending through the member and a tongue 35 adjacent to the notch. The section 9 has also an inner wall conformed in part to the outer circumference of the steering column 7, and conformed in part to the outer circumference of the hub of the steering wheel 8.

The section 10 has an inner wall conformed to the outer circumference of the steering column 7, two side members 33 in line with the respective side members of the section 9 and each having a notch 36 extending through the member and adapted to receive the tongue 35 of the corresponding side-member of section 9 and a tongue 37 engaging in the notch 34 of the corresponding side-member of section 9. The section 10 has an internally screw-threaded hole to accommodate a screw 31 which engages in a depression or hole 32 in the steering column 7.

When the housing has been connected with and secured on the steering column as hereinafter described, the screw 31 will be cut off close to the circumference of the section 10 and smoothly finished to render it practically non-removable.

The upper end of the section 10 abuts against the lower end of the hub of the steering wheel, to facilitate accurate placing of the section on the steering column and also to oppose upward driving of the housing when it is in place on the steering column. Preliminary to attaching the housing to the steering column a radial hole 22 will be drilled in the hub of the steering wheel 8 the hole being so located that when the parts assembled the upper end of the section 10 will be in contact with the lower end of the hub of the steering wheel; the locking bolt 18 will be in line with the hole 22; and the axes of the bolt 18, the steering column 7 and the screw 31, and the centres of the holes 22 and 32 will all lie in a single plane including the axis of the steering shaft 6. The practical advantage of placing all the axes in a single plane is; that when the screw 31 is tightened to cause the housing section 10 to pull on the section 9 to press its inner wall evenly and firmly against the circumference of the steering column, the pull is a straight pull, alike on all the tongues 35 and 37, thereby avoiding undue strain on any tongue and the breaking of the tongue; the screw 31 when set and cut off as described is non-removable and prevents rotation and also prevents longitudinal movement of the housing section 10 on the steering column; and the housing sections being firmly interlocked will not slip nor rattle; and this result is accomplished by the use of a single nonremovable screw serving every purpose of the plurality of screws generally used prior to my invention, thus materially reducing the cost of manufacture, increasing the convenience in use, dispensing with protruding lugs or ears on the housing and thereby increasing the symmetry of the housing as a whole.

The locking bolt 18 occupies the bore 16 and its enlarged head 19 occupies the counter-bore 17; the bolt has also a reduced part 21 adapted to enter the hole 22 in the hub of the wheel 8 to prevent rotation of the shaft.

The bolt 18 has a flat part 25 adjacent to the inner end of the screw 26, which prevents rotation of, but permits sliding of the bolt; and also has a notch 23 in which the latch 27 engages to prevent excessive outward movement of the bolt, and a notch 24 in which the latch engages to prevent any outward movement of the bolt while the end of the latch is in the notch. A coiled spring 20, in the counter bore 17, surrounds the bolt, is compressed by pushing the bolt inwardly by hand and acts to slide the bolt outwardly upon retraction of the latch.

A pin lock, designated as a whole by the numeral 14, is fixed in the chamber 13 of the section 9.

The pin lock has a slidable latch 27 adapted to be retracted by a lug 30 which is fixed on the inner end of the lock cylinder 29, which is rotative in the usual manner by a special key 15.

The spring 28 (Fig. 5) is compressed by the downwardly moving latch and acts to slide the latch upwardly.

Operation.

When the parts are assembled and secured as described the bolt 18 may be pushed inward by hand to cause the inclined wall of the notch 23 to depress the latch 27, and continued inward movement of the bolt will cause the latch, actuated by the spring 28 to enter the notch 24 and lock the bolt against outward movement. When the latch is in the notch 24, the pin 21 will be in the hole 22 and will lock the hub of the steering-wheel so that the shaft 6 cannot be rotated. To release the bolt 18 to permit retraction of the bolt, the special key 15 will be used to rotate the cylinder 29 to cause the lug 30 (Fig. 5) to pull the latch 27 downwardly, thereby permitting the spring 20 to slide the bolt outwardly until stopped by the inwardly extending screw 26, in readiness for the next operation.

I have shown the screw 31 extended outwardly beyond the member 10. It is to be understood however, that when the parts are assembled and secured, the screw 31 will be cut off flush with the outer surface of the member 10, and smoothly finished so it will be impracticable to remove the screw with any appliance ordinarily available.

Having fully described my invention, what I claim as new and desire to secure by Letters Patent is:

1. A housing for steering-system locks, comprising a first section having laterally projected side members extended outwardly parallel to each other, each member having a tongue and a notch adjacent to the tongue and extending transversely through the member, said section also having chambers to accommodate locking devices; an arched second section having laterally projected side members in line with the respective side members of said first section, each side member of said second section having a notch to receive the tongue of the corresponding member of said first section and a tongue engaging in the notch of the corresponding member of said first section; and a single screw on the second section adapted to prevent rotation of the interlocked sections.

2. A lock-housing usable in conjunction with the steering columns of automobiles and comprising a first section having an inner wall conformed to the circumference of the steering column and having chambers for locking devices, also having two laterally projected and outwardly extended side members each having a tongue and a notch; a second section having an inner wall conformed to the circumference of the steering column, also having two laterally projected and outwardly extended side members each having a tongue engaging in the notch of the corresponding side member of the first section, and each having a notch receiving the tongue of the corresponding side member of the first section; and a non-removable screw extending through said second section and adapted to engage in the steering column to closely and firmly unite the two casing sections with each other and with the steering column.

3. A housing for locking devices, usable in conjunction with the steering column of an automobile and comprising a first section having chambers containing locking devices and having an inner wall conformed to part of the circumference of the steering column, also having side members each having a notch and a tongue; a second section complemental to the first section and having an inner wall conformed to part of the circumference of the steering column and having side members each having a tongue engaging in a corresponding notch of said first section, also having a notch adapted to receive a corresponding tongue of said first section; and a non-removable screw extending through said second section and engaging in the steering column to support said second section on the steering column and bind the inter-locking tongues against each other to press said first section firmly against the steering column, to prevent rotation of the housing around the steering column and to prevent downward movement of said first section in opposition to said second section.

4. In a steering-system lock, the combination of a stationary steering column; a steering shaft rotative in the steering column; a steering wheel fixed on the steering shaft and rotative around the steering column and having a radial hole adapted to receive a locking bolt; a housing comprising two sections each having tongues and notches interlocking with the notches and tongues of the other, to unite the sections; a single securing device securing the united sections on the steering column; a non-rotative bolt slidable in one section of the housing and adapted to enter the radial hole in the hub of the steering wheel, to lock the steering shaft against the rotation; a key operated latch adapted to release the locking bolt; and a spring acting to slide the released locking bolt outwardly.

In witness whereof I have hereunto signed my name at Springfield, Illinois, this 26th day of November, 1920.

JAMES L. COOK.

Witnesses:
C. J. PETERSON, Jr.,
HENRY W. OFFER.